United States Patent [19]

Durham

[11] Patent Number: 5,974,388
[45] Date of Patent: Oct. 26, 1999

[54] PAINT CUSTOMER SERVICE INFORMATION METHOD AND APPARATUS

[75] Inventor: David A. Durham, Garden City, Mich.

[73] Assignee: American Standox, Inc., Plymouth, Mich.

[21] Appl. No.: 08/649,454

[22] Filed: May 17, 1996

[51] Int. Cl.⁶ ............................. G06F 15/21; G06F 15/24; G06F 17/60; G06F 15/20
[52] U.S. Cl. ................................ 705/1; 705/28; 235/385
[58] Field of Search ..................................... 705/26, 27, 1

[56] References Cited

U.S. PATENT DOCUMENTS

| | | | |
|---|---|---|---|
| 4,550,246 | 10/1985 | Markman | 235/385 |
| 4,591,983 | 5/1986 | Bennett et al. | 235/385 X |
| 4,648,037 | 3/1987 | Valentino | 705/36 |
| 5,097,528 | 3/1992 | Gursahaney et al. | 379/67 |
| 5,146,404 | 9/1992 | Calloway et al. | 705/1 |
| 5,153,825 | 10/1992 | Yauk et al. | 705/1 |
| 5,257,185 | 10/1993 | Farley et al. | 707/100 |
| 5,361,199 | 11/1994 | Shoquist et al. | 705/26 |
| 5,377,097 | 12/1994 | Fuyama et al. | 705/15 |
| 5,402,474 | 3/1995 | Miller et al. | 379/93.12 |
| 5,493,490 | 2/1996 | Johnson | 705/26 |
| 5,628,004 | 5/1997 | Gormley et al. | 707/104 |
| 5,701,419 | 12/1997 | McConnell | 705/27 |
| 5,717,595 | 2/1998 | Cherrington et al. | 705/400 |
| 5,737,227 | 4/1998 | Greenfield et al. | 705/400 |
| 5,737,726 | 4/1998 | Cameron et al. | 705/7 |

*Primary Examiner*—Allen R. MacDonald
*Assistant Examiner*—Pedro R. Kanof

[57] ABSTRACT

An apparatus for providing paint product related information to customers and recording customer telephone calls includes work stations (10, 23) having a memory device (18) storing a plurality of paint product information and a plurality of customer information, an input device (12) for generating a customer request for information signal related to a selected one of the paint products, a display device (14) for visually displaying information and graphic displays in response to display signals, a computer (13) responsive to the customer request for information signal for selecting from the customer information caller information related to a customer associated with the customer request and generating a first display signal to the display device (14) to visually display a call log graphic display (43) including the caller information (44), and being responsive to the customer request for information signal for selecting a portion of the paint product information related to advice to be given to the customer and generating a second display signal to visually display (58, 88) the selected portion of the paint product information on said display device (14) and a modem (16) connected between the computer (13) and a telephone system (17) for sending the selected portion of the paint product information to the customer.

14 Claims, 17 Drawing Sheets

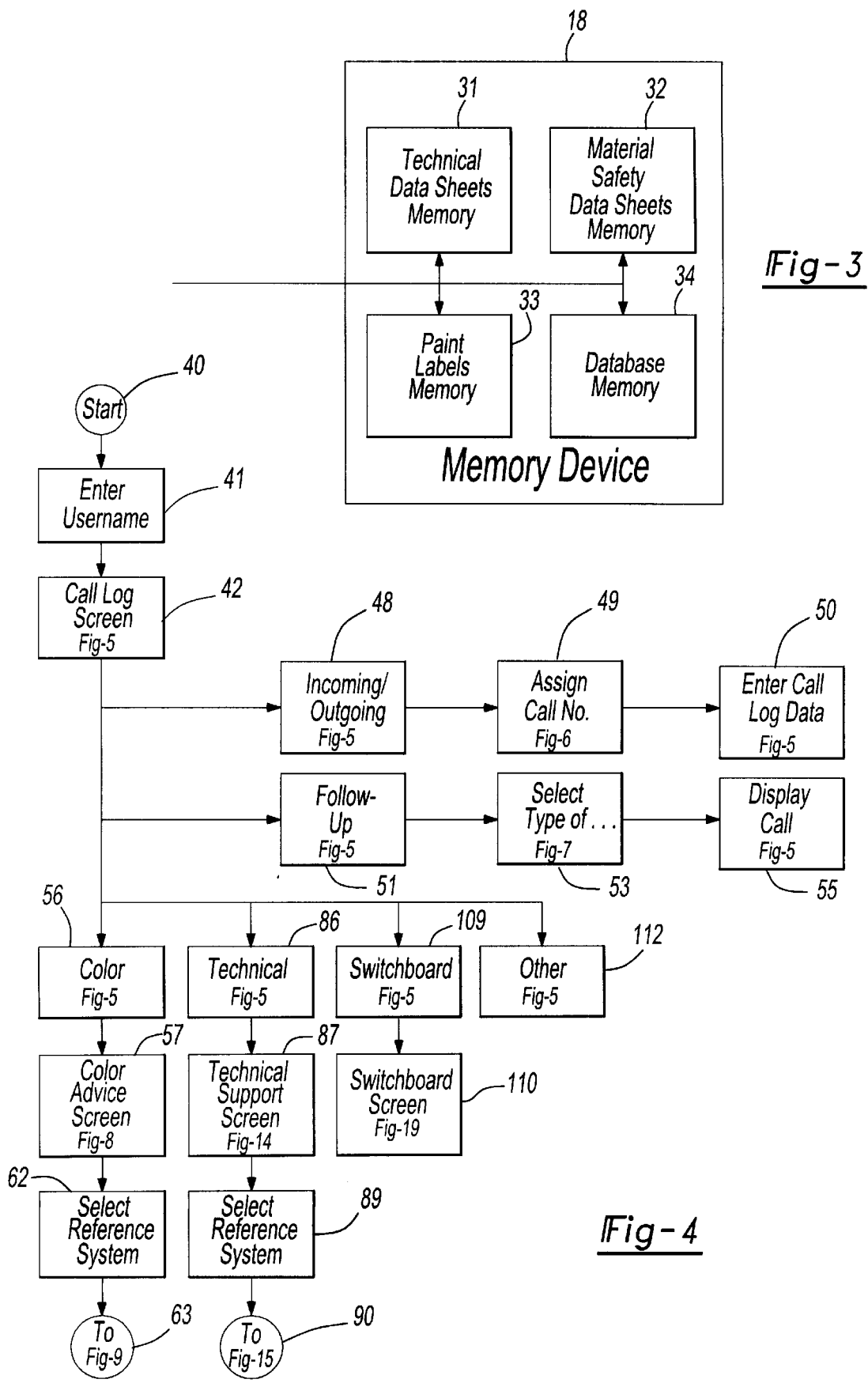

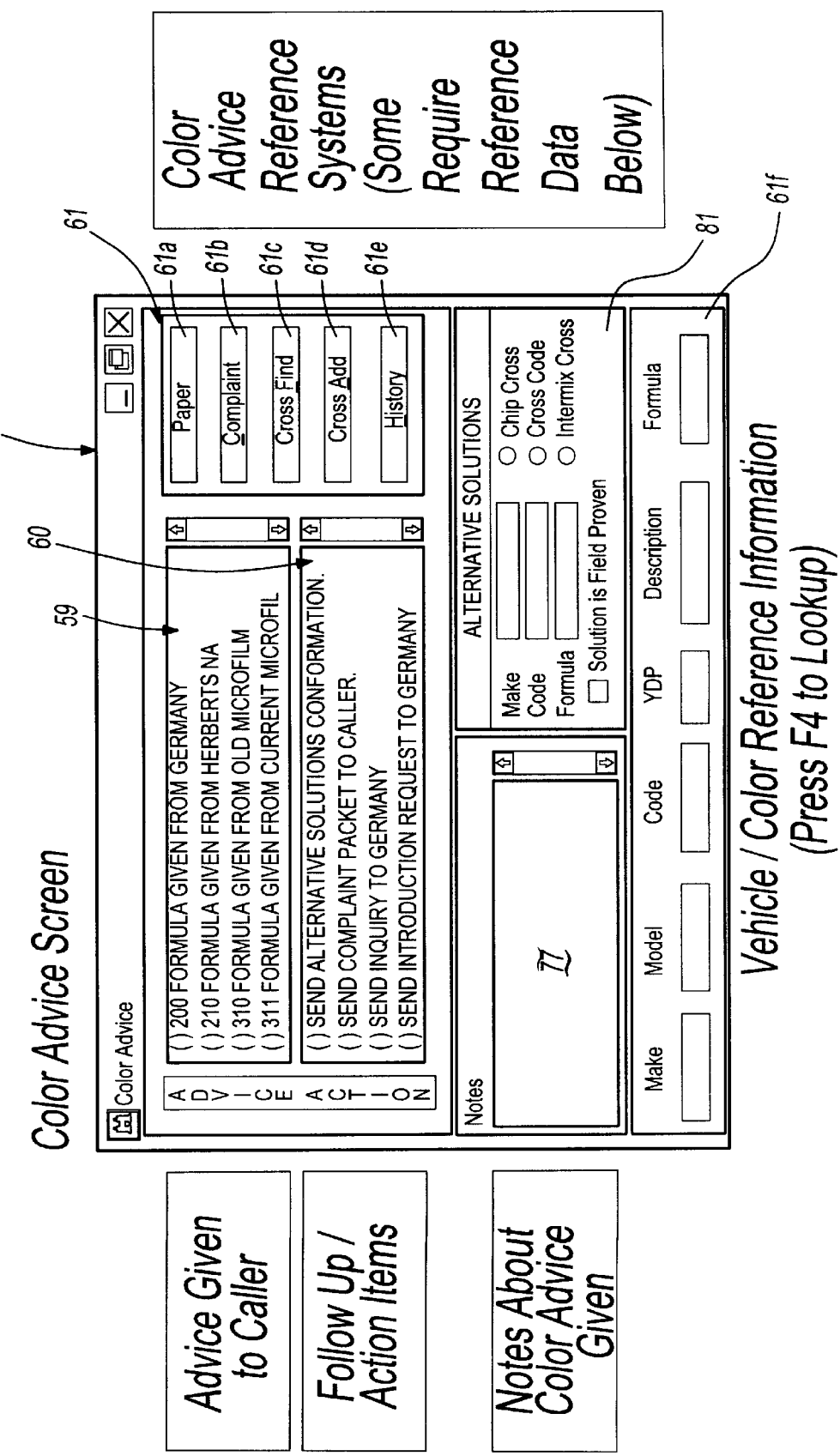

Color Advice Cross Reference

Search for Cro....

Exactly match all of the following:
- [x] Make
- [x] Model
- [ ] Color Code
- [x] Year of Production
- [ ] Description
- [ ] Formual

[ Serarch ] [ Abort ]

79a

79

61 — Paper / Complaint / Cross Find / Cross Add / History

61c

*Searches for Entered Reference Data and Returns with Cross Reference Info*

80

(ENTER) to accept a successful Cross Code search | (ESC) t....

| Make | Model | Code | Y.O.P. | Description |
|---|---|---|---|---|
| GM | TRUCK | 704A | 1958 | POLAR GREEN |
| GM | TRUCK | 704A | 1958 | POLAR GREEN |
| GM | CHEVY | 713962 | 1969 | LEMANS BLUE |
| GM | TRUCK | 7105677 | 1969 | TARTAN TURQU |
| GM | CAMARO | 72 | 1969 | HUGGER ORA |

81a

ALTERNATIVE SOLUTIONS
- ⦿ Chip Cross
- ○ Cross code
- ○ Intermix Cross

Make [ FIAT ]
Code [ 193 ]
Formula [ 26639 ]

☐ Solution is Field Proven

81b

Ready to Add New Data

ALTERNATIVE SOLUTIONS
- ○ Chip Cross
- ○ Cross code
- ○ Intermix Cross

Make [    ]
Code [    ]
Formula [    ]

☐ Solution is Field Proven

*Fig – 13*

PAINT CUSTOMER SERVICE INFORMATION METHOD AND APPARATUS

BACKGROUND OF THE INVENTION

The present invention relates generally to an information system for serving customers and, in particular, to a method and apparatus for providing and collecting information related to automotive paint customers.

Generally, knowledge systems can be grouped according to whether the primary purpose is for defining or checking equipment or processes, or for supporting a user in the tasks of learning, information retrieval, or problem-solving.

An example of the "defining and checking" type of knowledge system in shown in the U.S. Pat. No. 4,591,983 which describes a hierarchical knowledge base comprising a functional decomposition of a set of elements into subsets over a plurality of hierarchical levels, a plurality of pre-defined functions or conditions of the elements within the subsets of a plurality of the hierarchical levels, and a predefined set of operations to perform on a user-defined set of elements responsive to the functional knowledge base. A practical use of this system is inventory control and the processing of orders for flexibly assembling systems or items of manufacture, specifically embodied in a computer system to aid in the checking of orders for products or systems to be manufactured or assembled.

An example of the "supporting" type of knowledge system is shown in the U.S. Pat. No. 4,648,037 which describes a system and method for making available financial and employee benefit information to any one individual of a group of individuals who are members of an employer's benefits plan. The system enables an employee to interactively access information via a terminal, concerning their savings plans, withdrawal information, explanations of provisions, employee benefit information, explanation of savings plan and benefit options, and benefit news bulletins. Thus, this system is utilized merely for end-user information retrieval and for personal financial problem-solving.

As the number of knowledge or information users in the workplace increases, systems that can serve as reference or help users learn job tasks, specifically information processing tasks, have evolved to address three specific areas: information distribution, employee development and improved decision-making. Primarily implemented in an off-the-job context on mainframe systems, they are known respectively as on-line reference, computer-based training and problem-solving systems.

On-line reference systems are essentially an automation of flipping through a manual. Just as one might use a table of contents and separator tabs to flip to specific information in a three-ring notebook, an on-line reference system provides menu selections to tab down through a sequentially organized information file to retrieve and display the requested information. Such automation was designed to eliminate the costly problems of publishing and distributing the manual, and by storing it in one central resource, to eliminate the inaccuracy and inconsistency of information that results when individual pages are not updated. Because of the cost savings, many organizations eventually install several such systems, each to replace an existing manual. Since they are not cross-referenced and these individual systems are generally updated by the different departments who "own" them, the old problems of duplication and inconsistency that characterized multiple hard-copy manuals, often resurface. Other problems include content display that is difficult to read. Although studies have shown that reading a screen takes 30% longer than reading a hard-copy page, most reference systems are installed as verbatim copies of the paper bound manuals they replaced. In order to save cost and decrease the period of time required for implementation, many on-line reference systems were implemented by digital scanning or merely re-keying from hard copy. Moreover, while some may allow for rudimentary connections to other systems or remote data, cross-references and/or real integration with other systems or data is precluded due to the single-purpose, flat-file, sequential structures. To the extent cross-referencing between different knowledge content files has been attempted, this has normally been achieved by complex programming techniques which are not generalized and need skilled maintenance.

Another form of knowledge transmission has been computer based training. These systems have typically been designed for individualized self-study by following a system-controlled sequence of presenting content, testing knowledge levels, suggesting remedial activity, and repeating lessons where necessary. A clear disadvantage, however, is that the physical structure (flat-file, sequential) and design methodology creates severe limitations: (1) It precludes any ability to address individual information or learning style needs, e.g., the same content is presented to all, whether needed or not, pictures and text can only be presented where programmed to do so, and content can be geared to only one "average" skill level. The inherent flaws here are that there are no homogeneous audiences when relating to skill and knowledge levels, learning styles and job need. Further, people learn when they can control how and when they learn, e.g., in the sequence and the media that makes sense to them, not in the media, sequence and skill level of the instructor-developer. (2) Traditional course development methods are so tedious and time-consuming that course content is often obsolete by the time it has been developed. (3) Since training is usually a scheduled event, and not available at the time of actual need, the content learned but not applied within forty-eight hours is usually forgotten. (4) High development and maintenance costs, especially as compared to the actual developmental playback, remain a serious problem. (5) Finally, the sequential, flat-file structure precludes useful, maintainable integration with other systems or data.

Automated problem-solving systems generally fall into two different types. The inexpensive, simpler type uses a tree structure to narrow down a problem to the point whereby the system makes a specific recommendation to the user. While this provides an advantage of quick assistance in the solution of known, simple problems, the technique is also inherently system, not user-driven, which provides clear disadvantages to others: (1) It provides for little learning as the data analysis and decision-making is automated. (2) The value of the system is limited to the conditions and problems known to the programmer at the time. (3) Maintenance requires reprogramming. The other type, known as expert systems, perform the same functions with the same attendant problems but with increased severity because of its increased complexity. The heavy integration of complex logic with rules for professional application of complex knowledge is very difficult if not impossible to program. It requires the programmer to be as skilled in the expert knowledge and its application as in programming, and for all possible conditions and variables of complex problems to be redefined with an action related to each. Because of these impossible barriers, only a few real expert systems are working satisfactorily, at a cost of many millions for development and maintenance.

The U.S. Pat. No. 5,257,185 shows a knowledge system having a development configuration by which a knowledge engineer enters knowledge content into a database, and a user configuration employed by the end user to access the database for interactive learning, information retrieval, and problem solving in a specified subject area. The knowledge is organized by a hierarchy of topic nodes, with each node having an associated plurality of cross referenceable information units representing a variety of types, or categories, of information. The user can control the navigation path and information display sequence among information units in accordance with personal learning needs and style. One category can include a pattern of prompts and possible responses. The separation of knowledge content from program logic permits non-programmers to set up, modify, and maintain the knowledge content of the system.

SUMMARY OF THE INVENTION

The present invention concerns an apparatus for use in providing paint product related information to customers and recording customer telephone calls comprising: a memory means for storing a first plurality of paint image information related to a plurality of paint products and a second plurality of customer information; an input means for generating a customer request for information signal related to a selected one of the paint products; a display means for visually displaying information and graphic displays in response to display signals; and a computer means connected to the memory means, the input means and the display means and being responsive to the customer request for information signal for selecting from the customer information caller information related to a customer associated with the customer request for information signal, generating a first display signal to the display means to visually display a call log graphic display including the caller information, being responsive to the customer request for information signal for selecting from the image information an image related to technical advice to be given to the customer associated with the customer request for information signal, and generating a second display signal to the display means to visually display the image on the display means.

The method of serving customers of paint products according to the present invention comprises the steps of: generating a graphic display of a call log having a plurality of text boxes for recording information related to a telephone call with a customer; assigning a unique call number in response to each telephone call with customers; inputting into the text boxes in the call log graphic display call information related to an identity of a customer and notes taken during each of the telephone calls; storing the unique call number in association with the call information in the text boxes for each of the telephone calls and clearing the text boxes; and retrieving into the graphic display the unique call number and associated call information for a selected one of the telephone calls.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is a schematic block diagram of the memory device shown in the FIGS. 1 and 2;

FIG. 4 is a flow diagram of a portion of the method of operation of the customer service system shown in the FIG. 1;

FIGS. 5 through 8, 14, 19 and 20 are graphic representations of computer screens generated in the portion of the method of operation shown in the FIG. 4;

FIGS. 10 through 13 are graphic representations of computer screens generated in the portion of the method of operation shown in the FIG. 9;

DESCRIPTION OF THE PREFERRED EMBODIMENT

Figure 1:
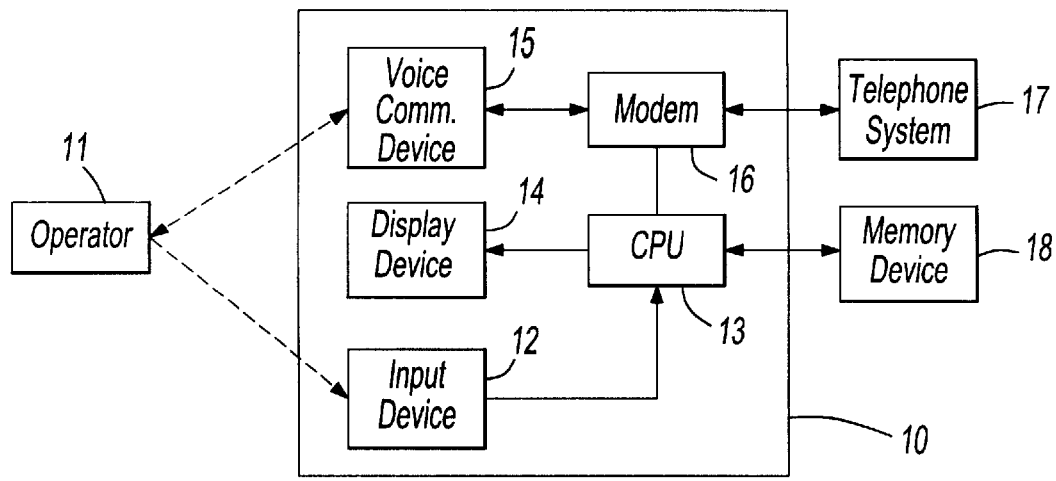
FIG. 1 is a schematic block diagram of a work station utilized in a customer service system in accordance with the present invention.

There is shown in the FIG. 1 a schematic block diagram of a work station 10 utilized in a customer service information system in accordance with the present invention. An operator 11 inputs command signals and information signals through an input device 12 having an output connected to an input of a computer means (CPU) 13. The input device 12 can be a keyboard, or a mouse, or a combination of such devices. The computer means 13 has an output connected to an input of a display device 14 such as a video monitor. The work station 10 also includes a voice communications device 15 which can be a separate microphone and speaker, or a telephone handset or headset. The voice communications device 15 has an input/output connected to a first input/output of a modem 16. A second input/output of the modem 16 is connected to a first input/output of the computer means 13 and a third input/output of the modem 16 is connected to an input/output of a standard telephone system 17. A second input/output of the computer means 13 is connected to an input/output of a memory device 18 as described below.

The computer means 13 executes a software program which permits the operator 11 to collect information from and provide information to a customer who makes an inquiry over the telephone system 17. The operator 11 utilizes the input device 12 to input information concerning the identity of the customer, which information is utilized by the computer means 13 to search the memory device 18 for any previously stored contacts with that customer. The input device 12 also permits the operator 11 to input information concerning the present contact with the customer for storage in the memory device 18. During the contact with the customer, the operator 11 can utilize the input device 12 to request product related information stored in the memory device 18 to be displayed on the screen of the display device 14. Thus, the operator 11 can read the product related information to the customer utilizing the voice communications device 15, the modem 16 and the telephone system 17. The operator 11 also can utilize the input device 12 to direct the computer means 13 to transmit the stored product related information through the modem 16 and the telephone system 17 to a receiving device, such as a facsimile machine or a printer located at the customer's place of business.

Figure 2:
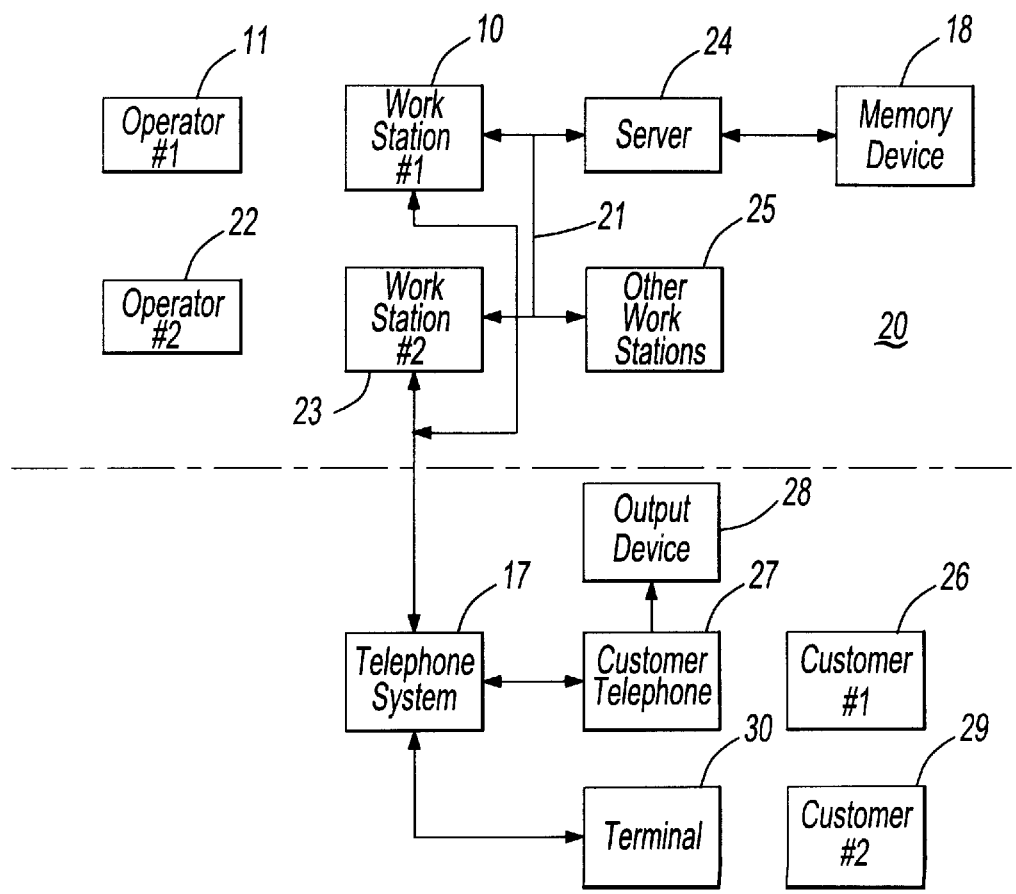
FIG. 2 is a schematic block diagram of a networked customer service system in accordance with the present invention including the work station shown in the FIG. 1.

There is shown in the FIG. 2 a networked customer service information system 20 which includes the work station 10 and the memory device 18 shown in the FIG. 1. The system 20 includes a plurality of work stations 10, 13, 25 which are networked together for use when more than one operator is required to serve the volume of customers calling in for information. For example, the operator #1 11 is stationed at the work station #1 10 which has the second input/output of the computer means 13 connected to a network bus 21. In a similar fashion, an operator #2 22 is stationed at a work station #2 23 which also has a second input/output of a computer means connected to the bus 21. The bus 21 is also connected to a first input/output of a server 24 which has a second input/output connected to the input/output of the memory device 18. Thus, any number of operators can utilize work stations connected to the bus 21 which work stations all have access to the memory device 18 through the server 26. The work station #1 10 and the work station #2 23 each have the third input/output of the modem 16 connected to the telephone system 17.

Customers can access the customer service information system 20 in various ways. For example, a customer #1 26 has a customer telephone 27 connected to the telephone system 17 for access to the customer service system 20. Typically, the work stations 10 and 23 are connected to a telephone switching circuit in the telephone system 17 which circuit directs incoming telephone calls to the available ones of the work stations in a predetermined sequence. For example, the work station #1 10 may be the first available work station and the operator 11 would receive the telephone call through the voice communications device 15. Communication between the operator 11 and the customer #1 26 will be strictly voice communication over the telephone system 17. However, if the customer #1 26 has an output device 28, such as a facsimile machine, the operator 11 can send information through the telephone system 17 to be printed out at the customer location.

A second type of customer communication is where a customer #2 29 has a terminal 30 connected to the telephone system 17. The customer #2 29 can directly access the memory device 18 through the use of the terminal 30 which communicates with one of the work stations 10 and 23 through the telephone system 17. The selected work station recognizes the customer terminal 30 and permits access to the memory device 18 through the server 24 on the bus 21.

The memory device 18 is shown in more detail in the FIG. 3. The memory device 18 includes a technical data sheets memory 31 in which are stored optical images of all technical data sheets published by the supplier. There is shown in the FIG. 3 the memory device 18 configured for use by a supplier of automotive paint products for providing product related information to customers such as distributors and end users. The memory device 18 includes a material safety data sheets memory 32 in which are stored optical images of all material safety data sheets published by the supplier. The memory device 18 includes a paint labels memory 33 in which are stored optical images of all paint labels published by the supplier. The memory device 18 also includes a database memory 34 in which is stored information concerning all previous customer contacts.

There is shown in the FIG. 4 a flow diagram of a portion of the method of operation of the computer program executed by each of the work stations 10 and 23. Preferably, the program is written to be executed utilizing a Microsoft® Windows™ operating system available from Microsoft Corporation, Redmond, Calif. The CPU 13 must be running a MS-DOS® version 6.2 or higher operating system with a Windows for Workgroups version 3.11 or higher. A Watermark Professional version 1.02 or higher application program is utilized to manage the stored images which include the data sheets and labels described above as well as received facsimile transmissions and any other reference materials to be used by the operators 11 and 22. The server 24 runs a Microsoft Windows NT version 3.51 or higher operating system with Novell Netware version 3.12 or higher to network the work stations 10 and 23 and Watermark Image Server version 1.02 or higher image management software.

The program starts at a circle START 40 and executes an instruction set ENTER USERNAME 41. The instruction set 41 prompts the operator 11 (FIG. 1) utilizing the display device 14 (FIG. 1) to enter some form of identification (username) which the program recognizes as being associated with an authorized user of the system. When the program has validated the username, an instruction set CALL LOG SCREEN 42 is executed. The instruction set 42 generates a Call Log window 43 as shown in the FIG. 5. Referring to the FIG. 5, the window 43 includes a Caller Information text area 44 which fills approximately the upper half of the screen. The area 44 has a plurality of text boxes for entering and/or displaying information about the customer. Below a left side of the Caller Information text area 44 is a Caller Type option button area 45 and below a right side is a Notes text box area 46. Extending across a lower portion of the screen 43, below the areas 45 and 46, is a Call Log button area 47.

Figure 6:
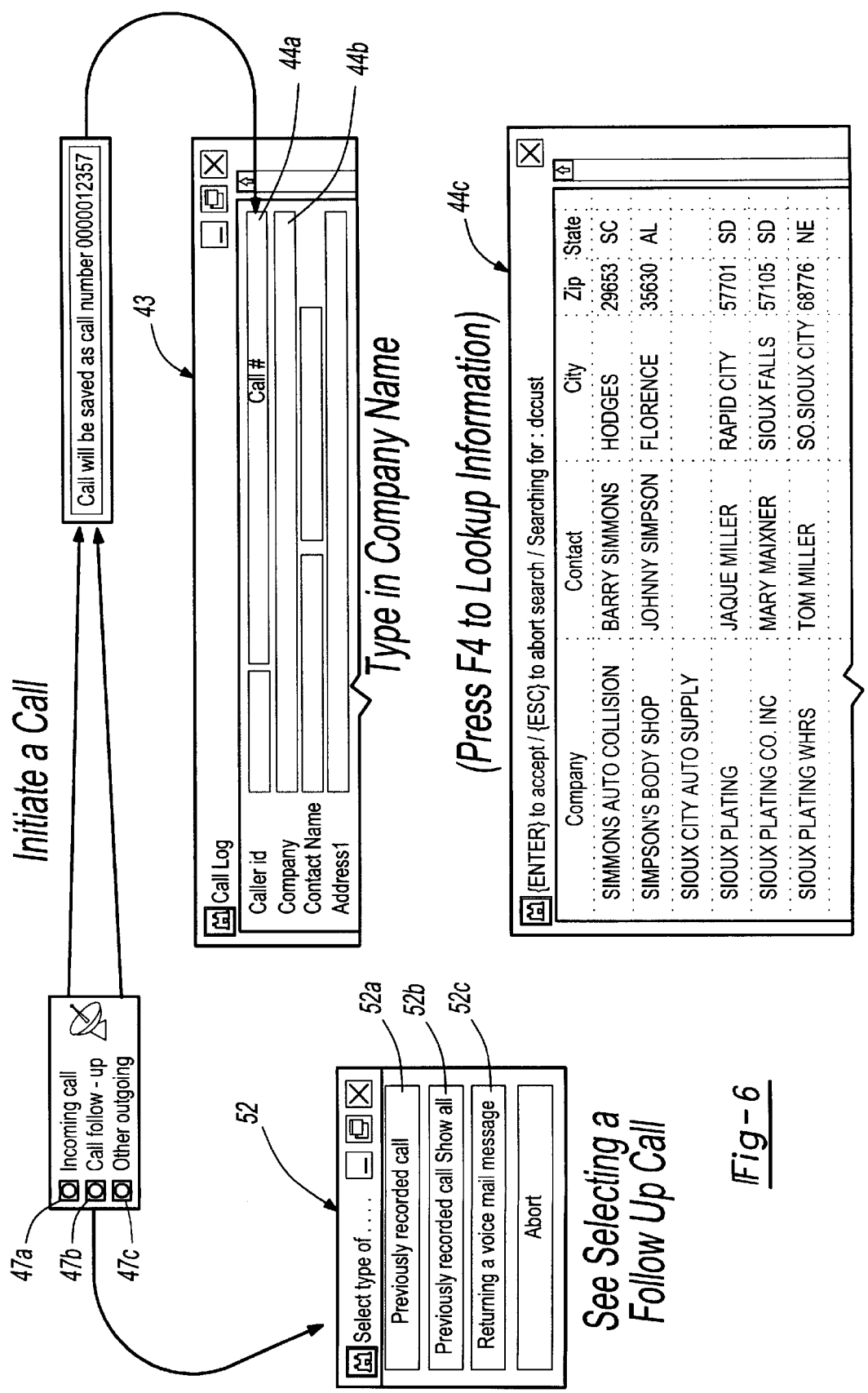

If an incoming call is received, the operator chooses an Incoming call option button 47a by clicking it which clicking is responded to by an instruction set INCOMING/OUTGOING 48 (FIG. 4) and the program then executes an instruction set ASSIGN CALL NO. 49 (FIG. 4) which causes the next one in a sequential series of unique call numbers to be assigned to this call and displayed in a Call # display box 44a as shown in the FIG. 6. Next, the program executes an instruction set ENTER CALL LOG DATA 50 (FIG. 4) wherein the operator enters the business entity name of the caller in a Company text box 44b. If the company name is in the database memory 34 (FIG. 3), the remainder of the text boxes in the Caller Information text area 44 will be filled in automatically by the program. If the operator does not know the form in which the company name is stored, a Lookup Information list box 44c (FIG. 6) can be displayed, typically by pressing a designated key on a keyboard of the input device 12 (FIG. 1).

Figure 5:
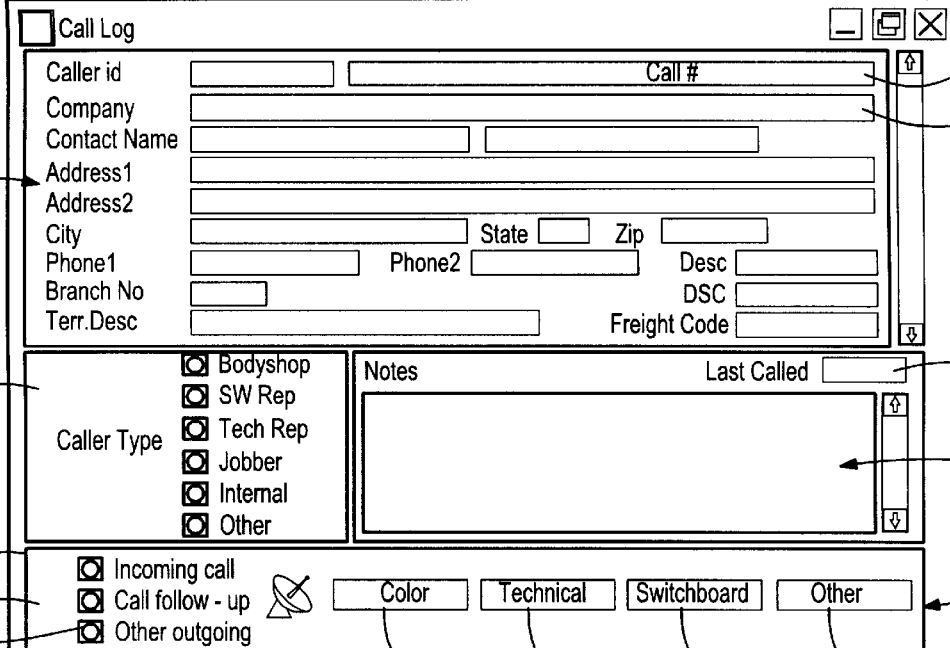

With reference to the FIG. 5, if the caller is a new business entity, the operator must fill in the text boxes in the area 44 and also select one of a plurality of option buttons in the Caller Type option button area 45 by clicking to identify the type of caller. Now the operator can take notes during the call by typing in the Notes text box area 46 which notes will be stored with the assigned call number (display 44a) in the database memory 34 (FIG. 3). A similar procedure is followed for an outgoing call wherein the operator chooses an Other Outgoing option button 47c by clicking on it. The program then executes the instruction sets 48, 49 and 50 of the FIG. 4 as described above.

Figure 7:
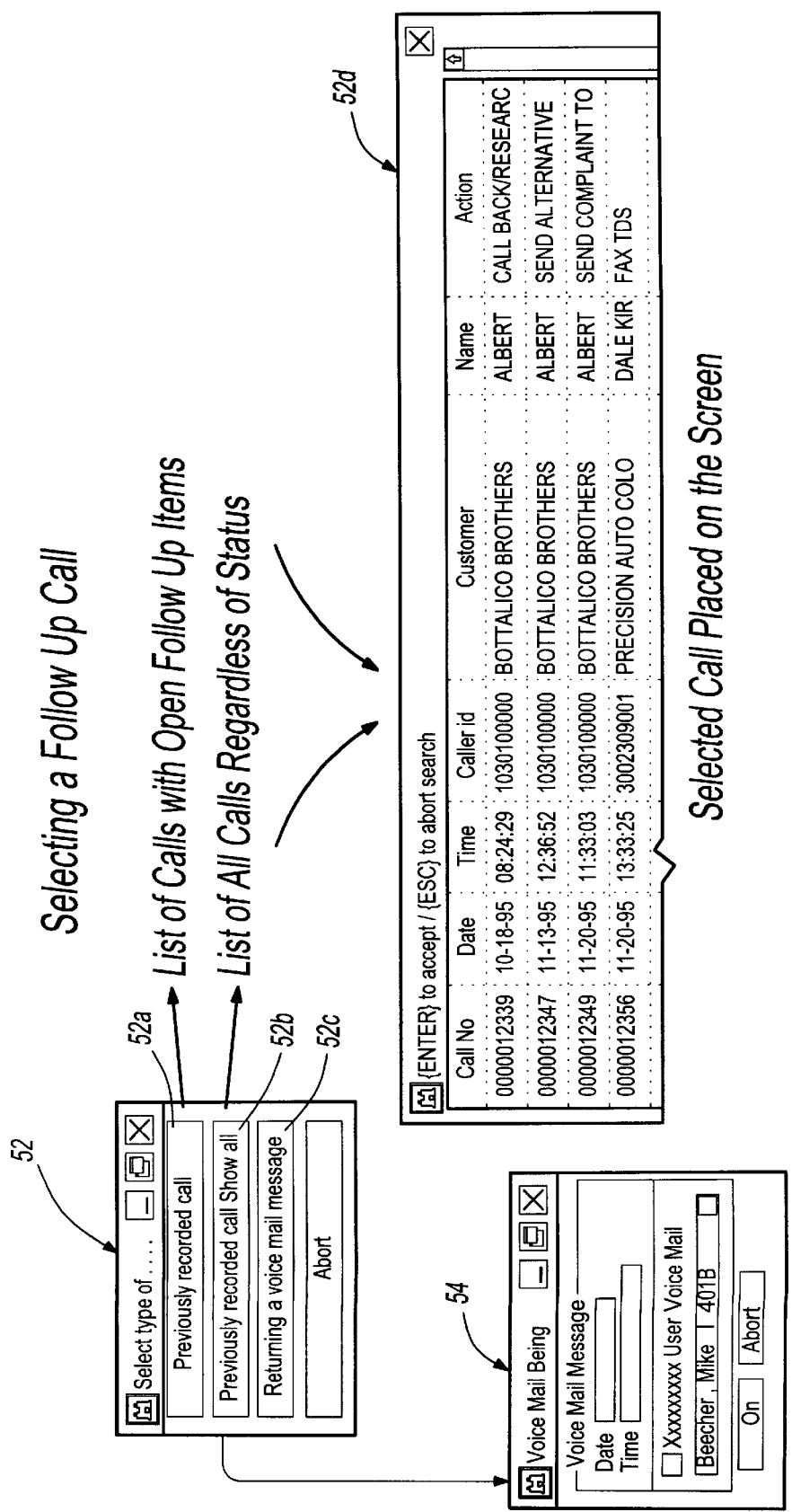

If the operator is following up on a previously logged call, the operator chooses a Call Follow-up option button 47b by clicking on it which clicking is responded to by an instruction set FOLLOW-UP 51 (FIG. 4) and the program executes an instruction set SELECT TYPE OF . . . 53 (FIG. 4) to generate a Select type of . . . command button window 52 as shown in the FIGS. 6 and 7 containing a plurality of command buttons related to different types of calls to be followed up on. With reference to the FIG. 7, if either of a Previously recorded call command button 52a or a (Previously recorded call) Show all command button 52b is chosen by clicking, the instruction set 53 (FIG. 4) generates a List of Calls dialog box 52d. Clicking on the button 52a causes the displayed list to contain only calls with open follow-up items. Clicking on the button 52b causes the displayed list to include all calls regardless of status. The operator selects a call in the display 52d by clicking on the proper line in the box and the program executes an instruction set DISPLAY CALL 55 (FIG. 4) whereby the stored information is displayed in the text boxes of the Call Log window 43 (FIG. 5). The operator calls the customer and again can enter text in the Notes text box area 46 (FIG. 5) or change any of the displayed information. Choosing a Returning a voice mail message command button 52c causes the instruction set 53 (FIG. 4) to generate a Voice Mail Being . . . window 54 to be displayed whereby the operator can access stored voice mail messages for himself/herself or another person.

Figure 9:
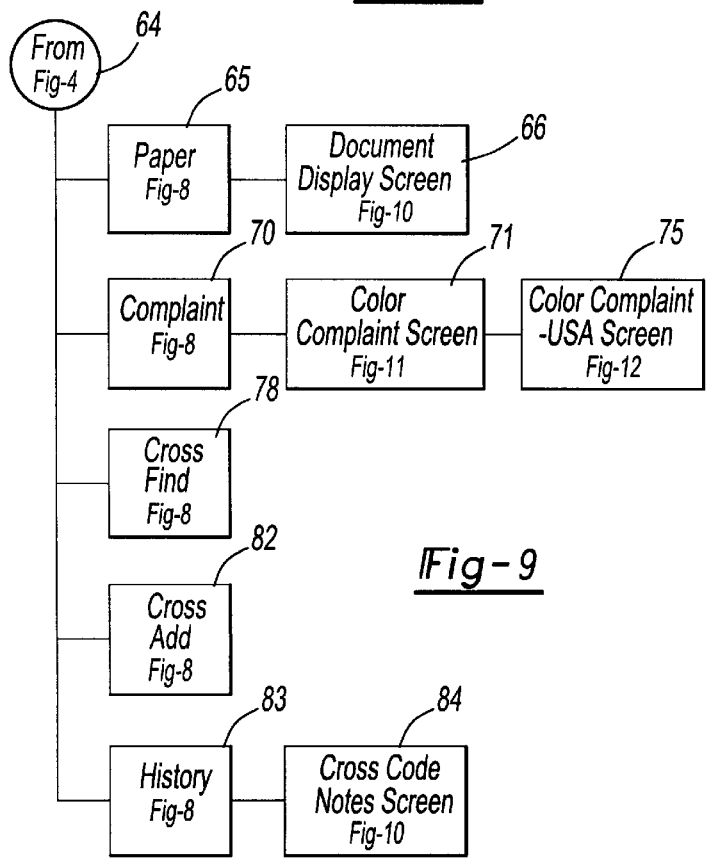
FIG. 9 is a continuation of the flow diagram shown in the FIG. 4.

With reference to the FIG. 5, during any call, the operator can choose any of the command buttons displayed in the Call Log button area 47. For example, clicking on a Color command button 47d causes an instruction set COLOR 56 (FIG. 4) to respond and the program executes an instruction set COLOR ADVICE SCREEN 57 (FIG. 4) whereby a Color Advice window 58 is displayed as shown in the FIG. 8. Referring to the FIG. 8, in an upper left area, the window 58 includes an Advice dialog box 59 above an Action dialog box 60 whereby the operator can indicate the advice given to the caller and any follow up or action items respectively by selecting the appropriate lines. To the right of the dialog boxes 59 and 60 is a Command button area 61 for use by the operator. The area 61 includes a plurality of buttons 61a through 61e for choosing a color advice reference system according to an instruction set SELECT REFERENCE SYSTEM 62 (FIG. 4) which instruction set causes the program to branch from a circle TO 63 (FIG. 4) to a circle FROM 64 (FIG. 9). Across the bottom of the window 58 is a Reference Data text area 61f which displays vehicle/color reference information which is required by some of the color advice reference systems. If a Paper command button 61a is chosen, the program responds with an instruction set PAPER 65 (FIG. 9) and then executes an instruction set DOCUMENT DISPLAY SCREEN 66 (FIG. 9) to generate a Watermark Professional Edition window 67 as shown in the FIG. 10. Referring to the FIG. 10, in an upper area, the window 67 includes an row of command buttons 68 for handling documents stored in the database memory 34 (FIG. 3) from which the operator can select a display of an image of any paper correspondence related to the color specified. Once the document image is displayed in an Images Display box area 69 directly below the buttons 68, the operator can select a function to be performed such as printing a hard copy of the document.

Figure 11:
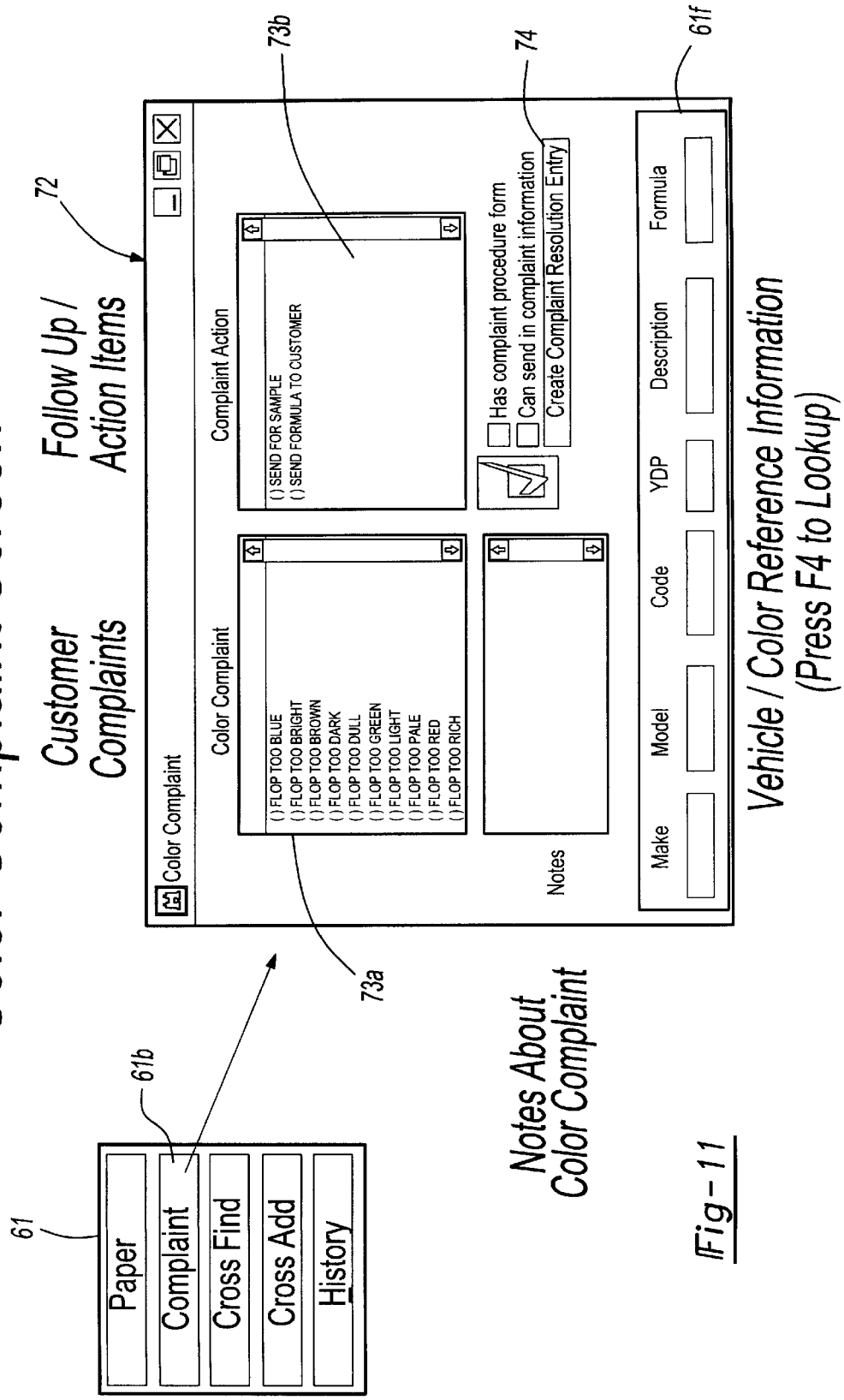
Figure 12:
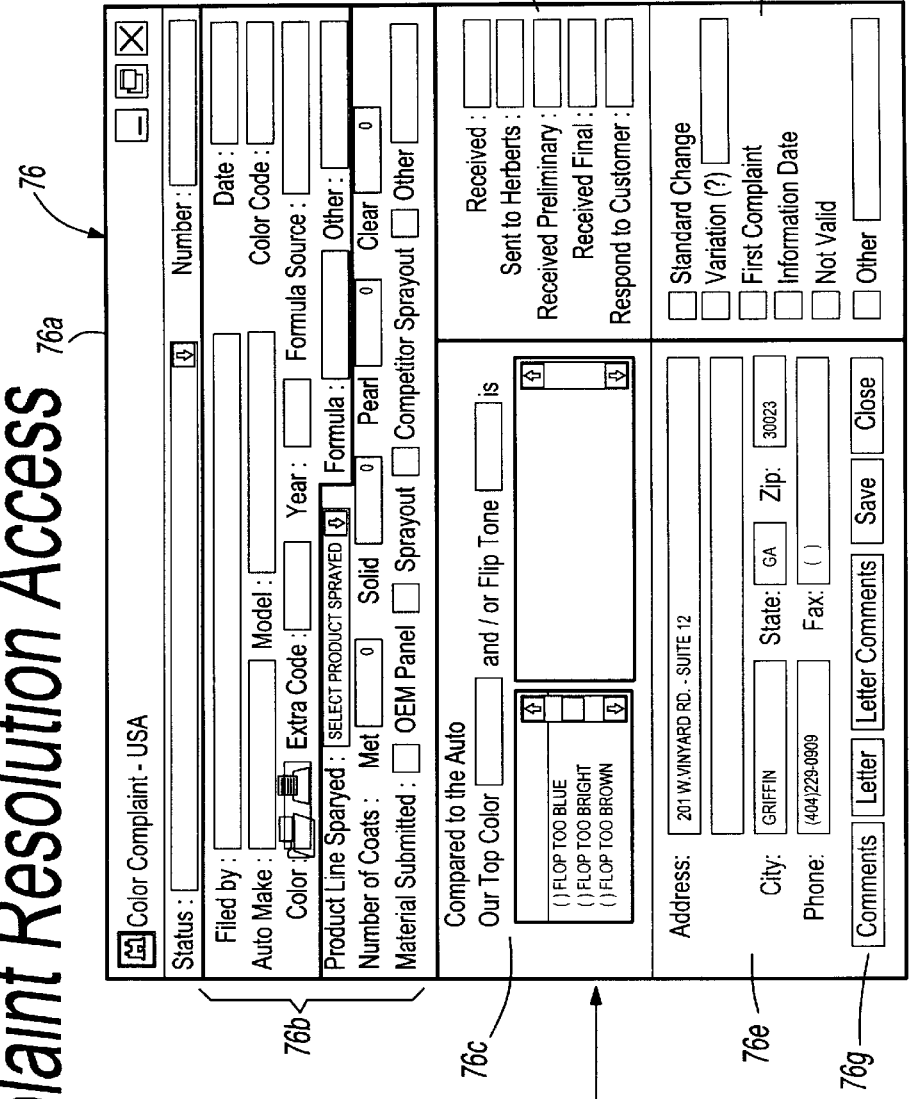

If a Complaint command button 61b (FIG. 8) is chosen, the program responds in an instruction set COMPLAINT 70 (FIG. 9) and enters an instruction set COLOR COMPLAINT SCREEN 71 to display a Color Complaint window 72 as shown in the FIG. 11. Referring to the FIG. 11, the operator can select the type of complaint in a Color Complaint list box 73a and the type of action taken in a Complaint Action list box 73b. This reference system requires the Reference Data text area 61f which is positioned at the bottom of the window. A lookup list (not shown) can be accessed in the database memory (FIG. 3) to obtain the required vehicle/color information. The Color Complaint window 72 also includes a Create Complaint Resolution Entry command button 74. Choosing the button 74 causes the program to execute an instruction set COLOR COMPLAINT-USA SCREEN 75 (FIG. 9) whereupon a Color Complaint-USA window 76 is generated as shown in the FIG. 12. Referring to the FIG. 12, the window 76 includes numerous text boxes for entering information related to the color complaint and the window 58 (FIG. 8) includes a Notes text box 77 in a lower left area for entering information about the color advice given. A Status list box 76a is provided for selecting a status of the complaint entry being created. Below the box 76a is an On Site Facts text area 76b for collecting information about the product use on which the complaint is based such as person submitting the form, date, vehicle information, formula source, product line used and what was submitted to compare. Below the area 76b is a Complaint text area 76c to the left, for defining what is wrong with the color and color notes, and a Progress text area 76d to the right, for entering dates on which various actions were taken. Below the area 76c is an Address text area 76e for the address and telephone numbers of the complainant, and below the area 76d is a Result text area 76f with check boxes for entering other information about the complaint. At the bottom of the Address text area 76e is a Command Buttons area 76g for choosing a "Comments" window to add comments, choosing to print a "Letter" thanking the customer, choosing a "Letter Comments" window to enter text to appear in the letter, choosing to "Save" the complaint and close the window and choosing to "Close" the window without saving the complaint. The complaints are saved in the database memory 34 (FIG. 3).

If a Cross Find button 61c (FIG. 8) is chosen, the program responds in an instruction set CROSS FIND 78 (FIG. 9) which generates a Search for Cro . . . window 79 having a plurality of check boxes as shown in the FIG. 13. Referring to the FIG. 13, one or more of the check boxes is selected by the operator and then a Search command button 79a is chosen causing the program to search for reference data and display one or more cross references in a Cross Code dialog box 80. If the operator selects one of the cross references displayed in the box 80, the program displays an Alternative Solutions area 81a providing information as to the make, code and formula and the type of cross in a lower right Alternative Solutions text box area 81 (FIG. 8) of the screen 58.

If the operator chooses a Cross-Add command button 61b(FIG. 8), the program responds in an instruction set CROSS ADD 82 (FIG. 9). The program then displays a blank Alternative Solutions area 81b, as shown in the FIG. 13, whereby the operator can enter information identifying an alternative solution for storage in the database memory 34 (FIG. 3).

Figure 10:
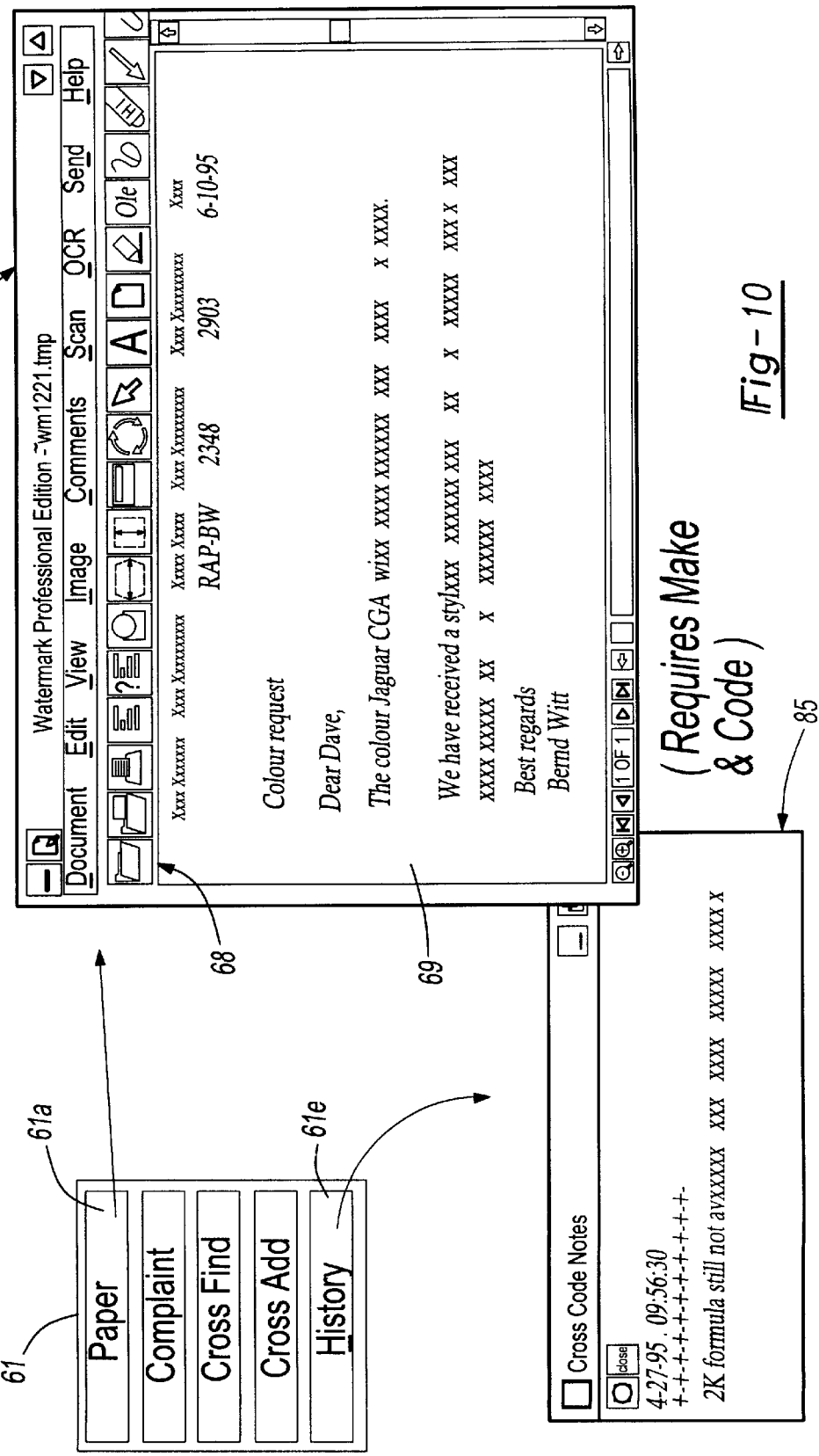

If the operator chooses a History command button 61e (FIG. 8), the program responds in an instruction set HISTORY 83 (FIG. 9) and executes an instruction set CROSS CODE NOTES SCREEN 84 which generates a Cross Code Notes window 85 as shown in the FIG. 10. Referring to the FIG. 10, stored information about the previous advice given is retrieved from storage in the database memory 34 (FIG. 3) and displayed in the text box of the window 85.

Figure 14:
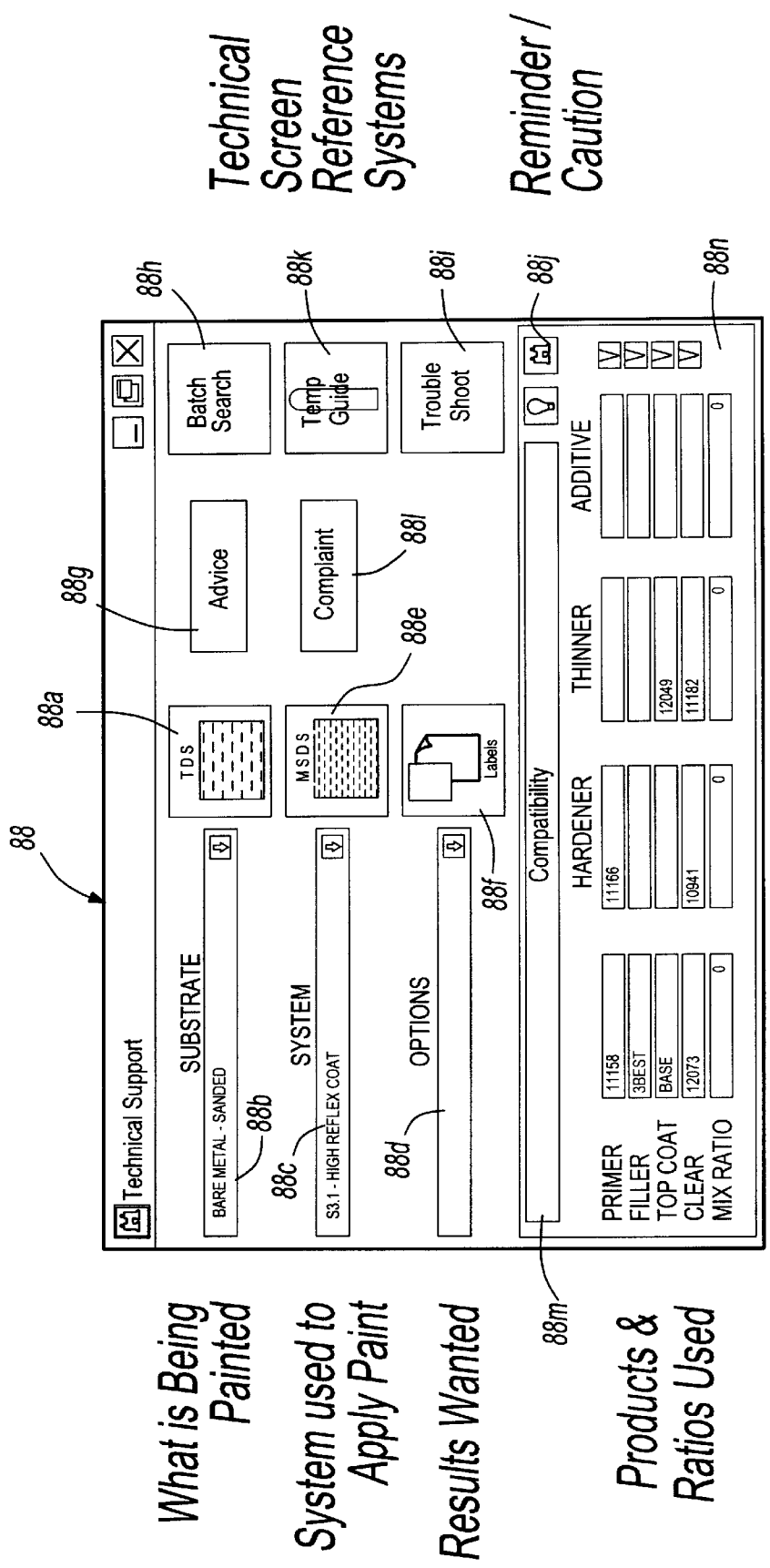
Figure 15:
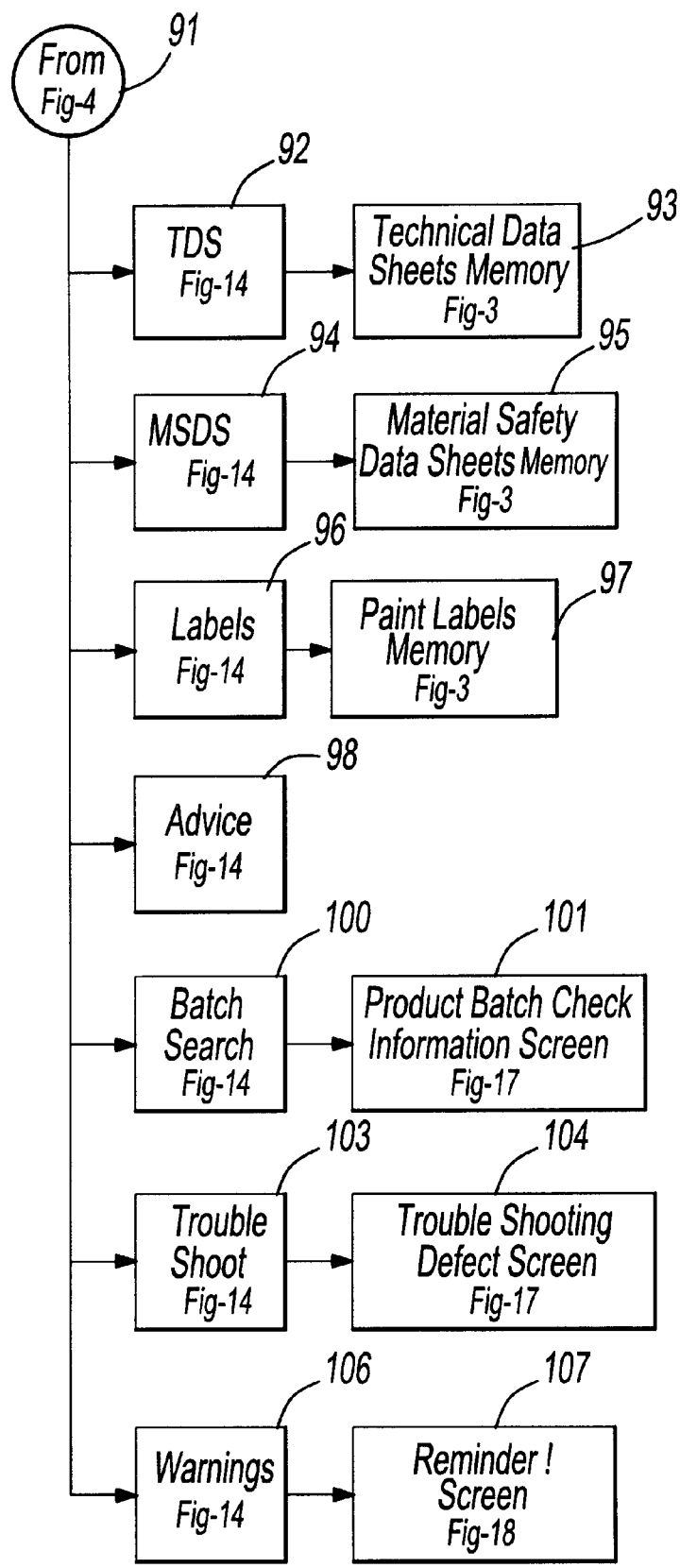
FIG. 15 is a continuation of the flow diagram shown in the FIG. 4.

If a Technical command button 47e (FIG. 5) is chosen by the operator, the program responds in an instruction set TECHNICAL 86 (FIG. 4) and then executes an instruction set TECHNICAL SUPPORT SCREEN 87 (FIG. 4) which generates a Technical Support window 88 as shown in the FIG. 14. The program then enters an instruction set SELECT REFERENCE SYSTEM 89 (FIG. 4) and exits at a circle TO 90 (FIG. 4) to enter a flow diagram shown in the FIG. 15 at a circle FROM 91. The flow diagram shown in the FIG. 15 represents choices to be made from a plurality of command buttons in the window 88 (FIG. 14) such as a TDS command button 88a. With reference to the FIG. 14, the operator enters current use information provided by the customer by selecting what is being painted in a Substrate dialog box 88b, selecting a system used to apply the paint in a System dialog box 88c and selecting a wanted result in an Options dialog box 88d. Now the operator is ready to choose the type of technical information to be accessed.

In the FIG. 14, if the TDS command button 88a is chosen, the program responds in an instruction set TDS 92 (FIG. 15) and enters an instruction set TECHNICAL DATA SHEETS MEMORY 93 (FIG. 15). The program then searches the technical data sheets memory 31 (FIG. 3) to retrieve and display any related technical data sheets. If an MSDS command button 88e is chosen, the program responds in an instruction set MSDS 94 (FIG. 15) and enters an instruction set MATERIAL SAFETY DATA SHEETS MEMORY 95 (FIG. 15) whereby an image of any materials safety data sheet related to the technical information is obtained from the material data safety sheets memory 32 (FIG. 3) and displayed. If a Labels command button 88f is chosen, the program responds in an instruction set LABELS 96 (FIG. 15) and then enters an instruction set PAINT LABELS MEMORY 97 (FIG. 15) whereby an image of any related paint labels is obtained from the paint labels memory 33 (FIG. 3) and displayed.

Figure 16:
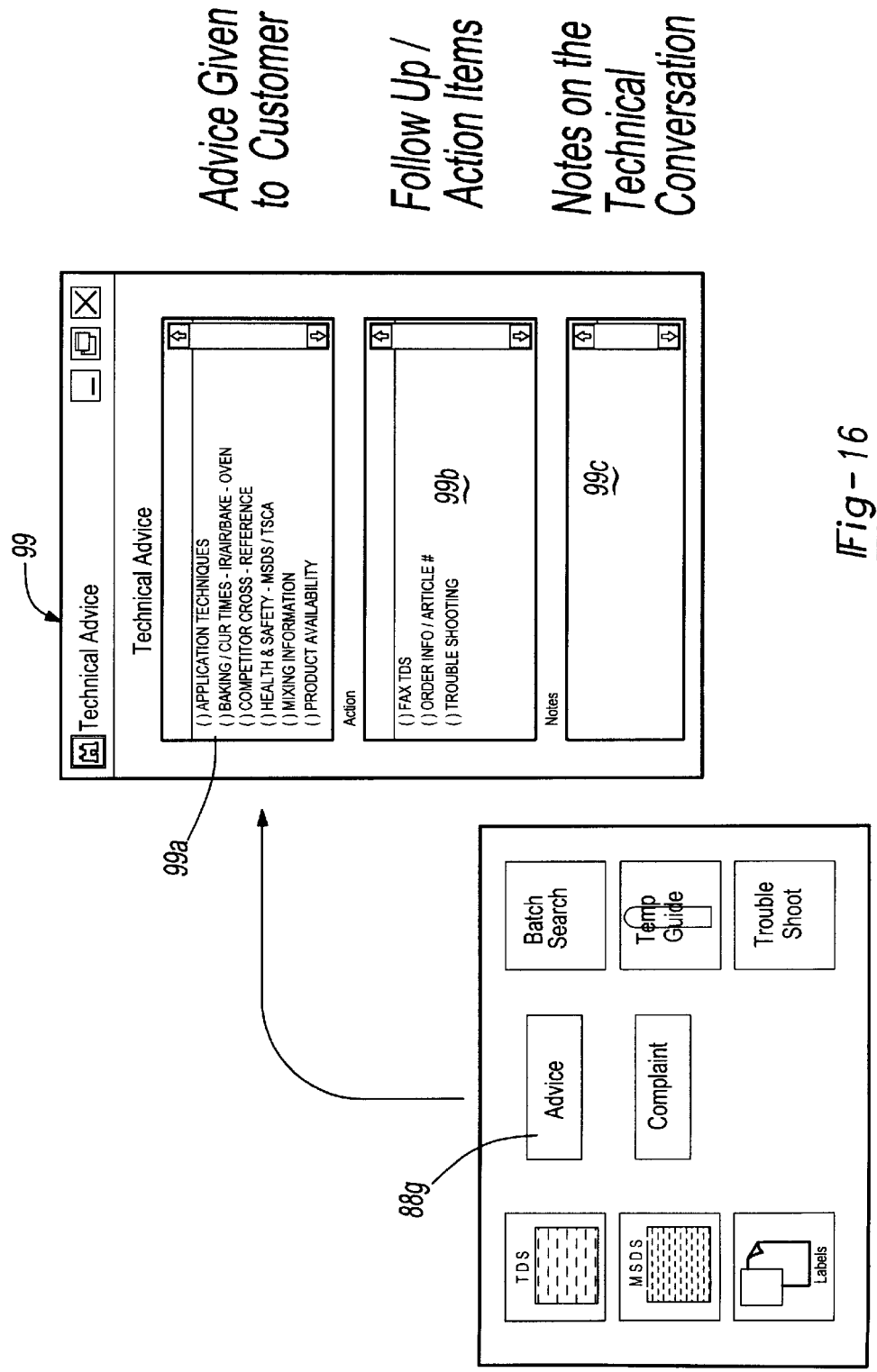
FIGS. 16 through 18 are graphic representations of computer screens generated in the portion of the method of operation shown in the FIG. 15.

If the operator chooses an Advice command button 88g, the program responds in an instruction set ADVICE 98 (FIG. 15) whereby a Technical Advice window 99 is displayed as shown in the FIG. 16. In the FIG. 16, the Technical Advice window 99 has a Technical Advice Given list box 99a displaying options to select the type of advice given to the customer. Below the box 99a is an Action list box 99b wherein the operator can select follow up or action items. Below the box 99b is a Notes text box 99c wherein the operator can make notes on the technical conversation with the customer.

Figure 17:
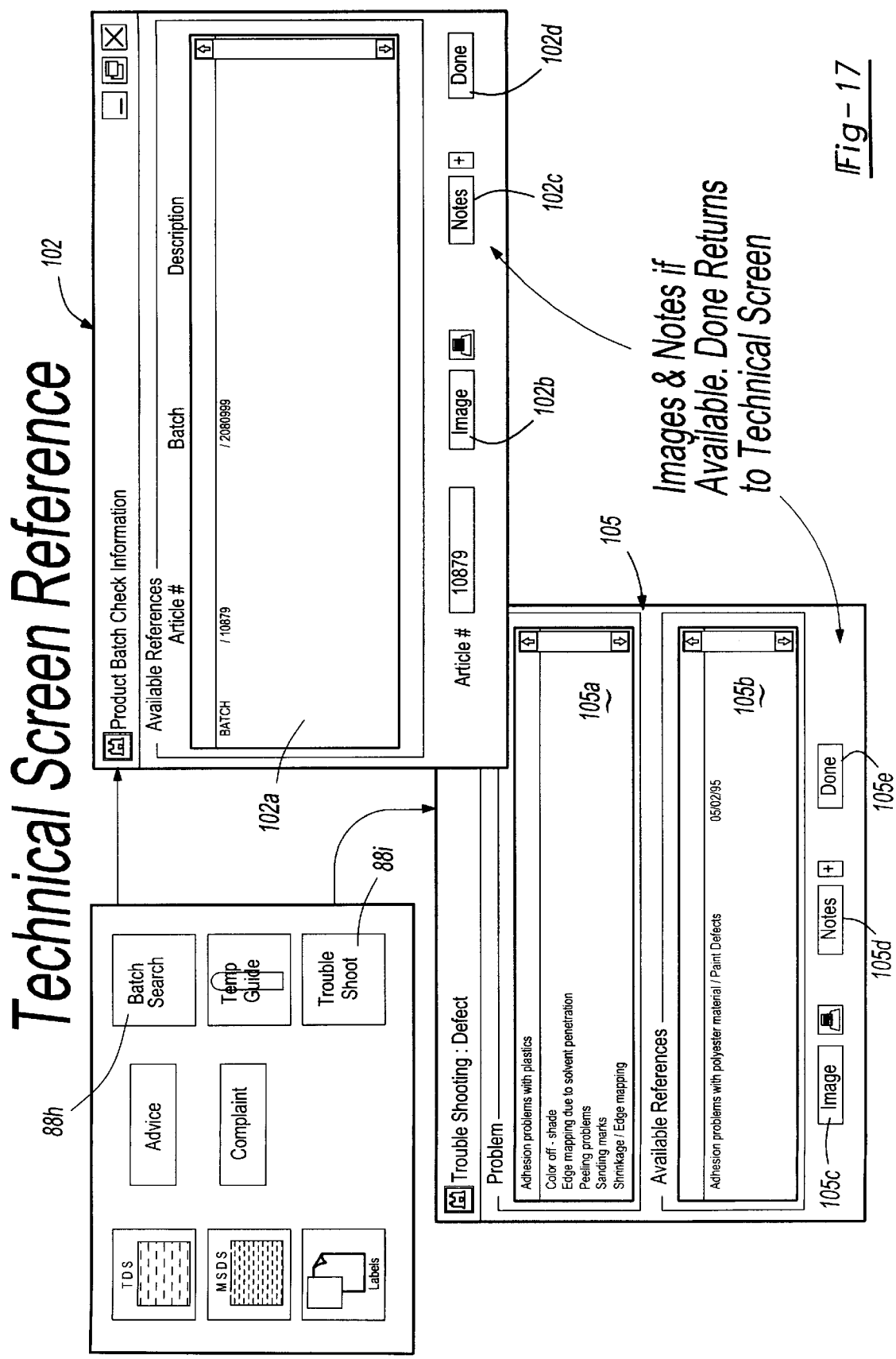

In the FIG. 14, if the operator chooses a Batch Search command button 88h, the program responds in an instruction set BATCH SEARCH 100 (FIG. 15) and enters an instruction set PRODUCT BATCH CHECK INFORMATION SCREEN 101 (FIG. 15) wherein a Product Batch Check Information window 102 is displayed as shown in the FIG. 17. In the FIG. 17, the window 102 includes a list box wherein the program lists any available references related to batches. Choosing an Image command button 102a will cause the program to display any related image stored in the memory device 18 (FIG. 3). Choosing a Notes command button 102b will cause the program to display any related notes stored in the memory device 18 (FIG. 3). Choosing a Done command button 102c causes the program to return to the Technical Support window 88 (FIG. 14).

In the FIG. 14, if the operator chooses a Trouble Shoot command button 88i in the window 88, the program responds in an instruction set TROUBLE SHOOT 103 (FIG. 15) and enters an instruction set TROUBLE SHOOTING: DEFECTS SCREEN 104 (FIG. 15) which generates a Trouble Shooting: Defect window 105 shown in the FIG. 17. In the FIG. 17, the window 105 includes a Problem list box 105a for selecting the type of problem. An Available References list box 105b shows related references to the problem selected. An Image command button 105c, a Notes command button 105d and a Done command button 105e are similar to the buttons shown in the screen 102.

Figure 18:
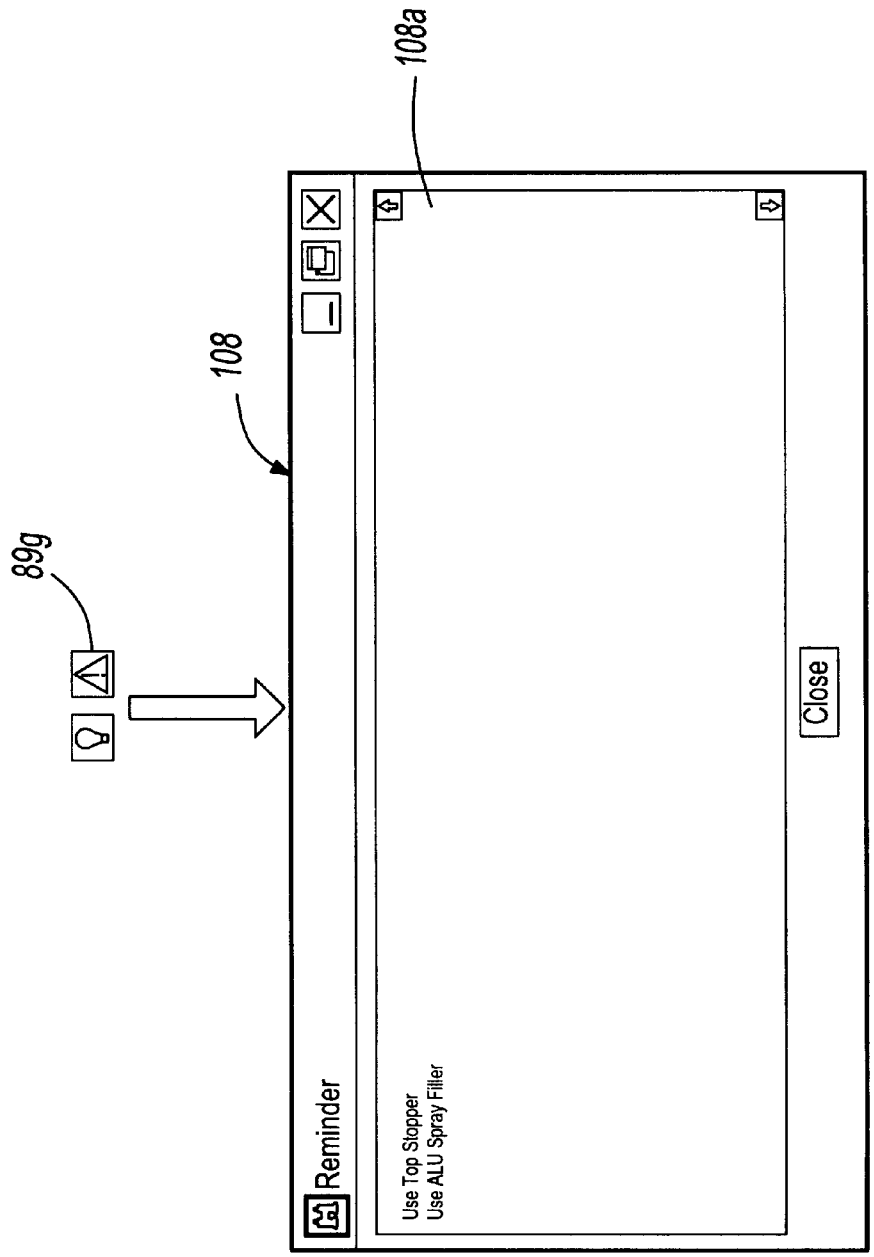

In the FIG. 14, if the operator chooses a Reminder/Caution command button 88j, the program responds an instruction set WARNINGS 106 (FIG. 15) and enters an instruction set REMINDER! SCREEN 107 (FIG. 15) which generates a Reminder! window 108 as shown in the FIG. 18. In the FIG. 18, the window 108 includes a Reminder display box 108a which shows reminders and warnings which are stored in the database memory 34 (FIG. 3).

In the FIG. 14, the window 88 also includes a Temp Guide command button 88k which the operator can choose to display information about the temperate ranges at which the products are to be used which information is stored in the database memory 34 (FIG. 3). If a complaint is identified during the technical information search, a Complaint command button 88l can be chosen by the operator to switch to the Color Complaint window 72 (FIG. 11). Also provided is a Compatibility command button 88m for causing to be displayed in a Compatibility text box area 88n information as to a primer, a filler, a top coat, a clear coat and a mix ratio in rows in a first column and corresponding columns for hardener, thinner and additive.

Figure 19:
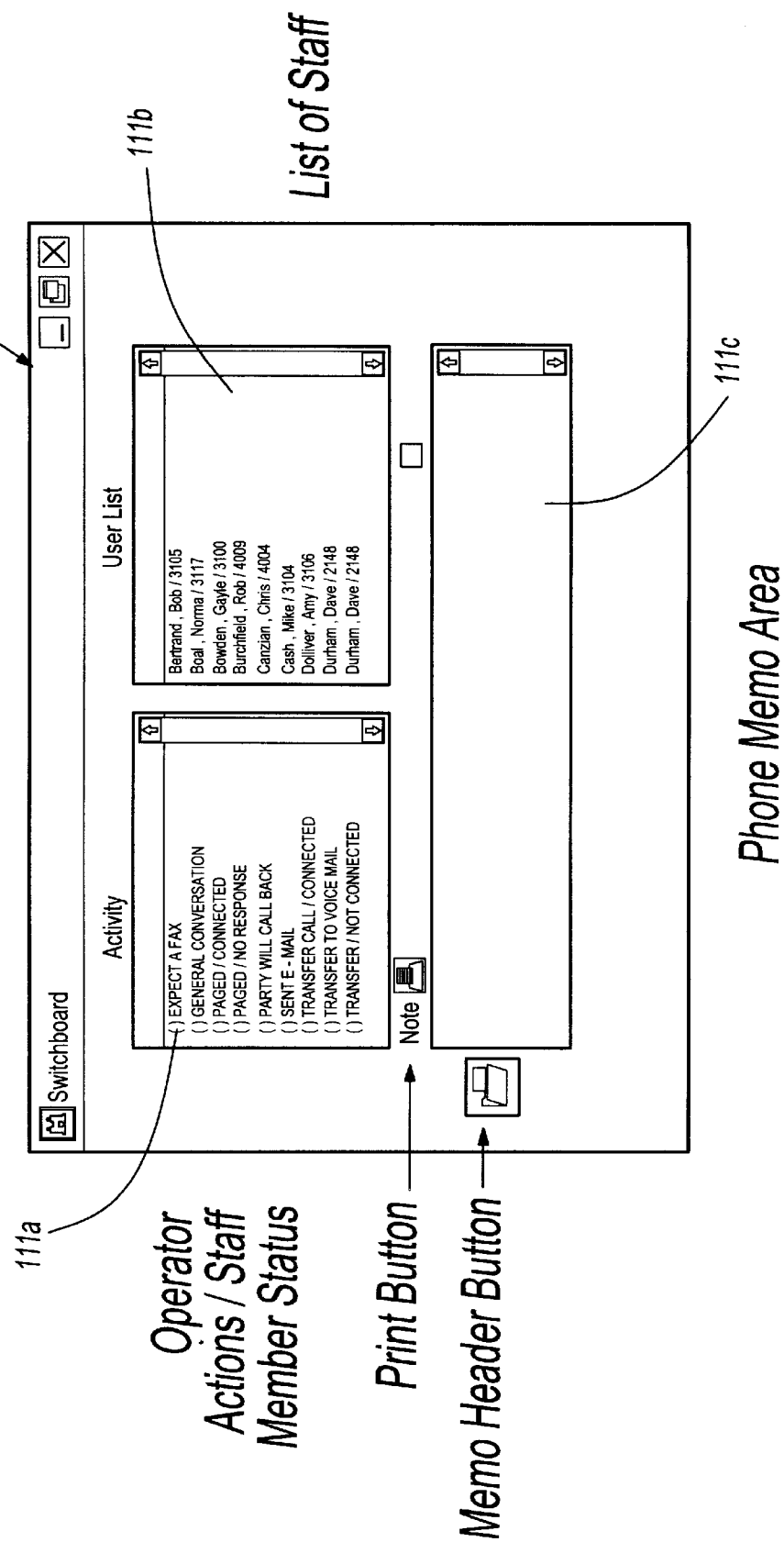

The window 43 (FIG. 5) also includes a Switchboard command button 47f. The program responds to choosing the button 47f in an instruction set SWITCHBOARD 109 (FIG. 4) and enters an instruction set SWITCHBOARD SCREEN 110 (FIG. 4) to generate a Switchboard window 111 shown in the FIG. 19. In the FIG. 19, the window 111 includes an Activity list box 111a for selecting operator actions/staff member status, a User list box 111b for selecting a staff member and a Note text box 111c for recording a memo about the telephone call.

Figure 20:
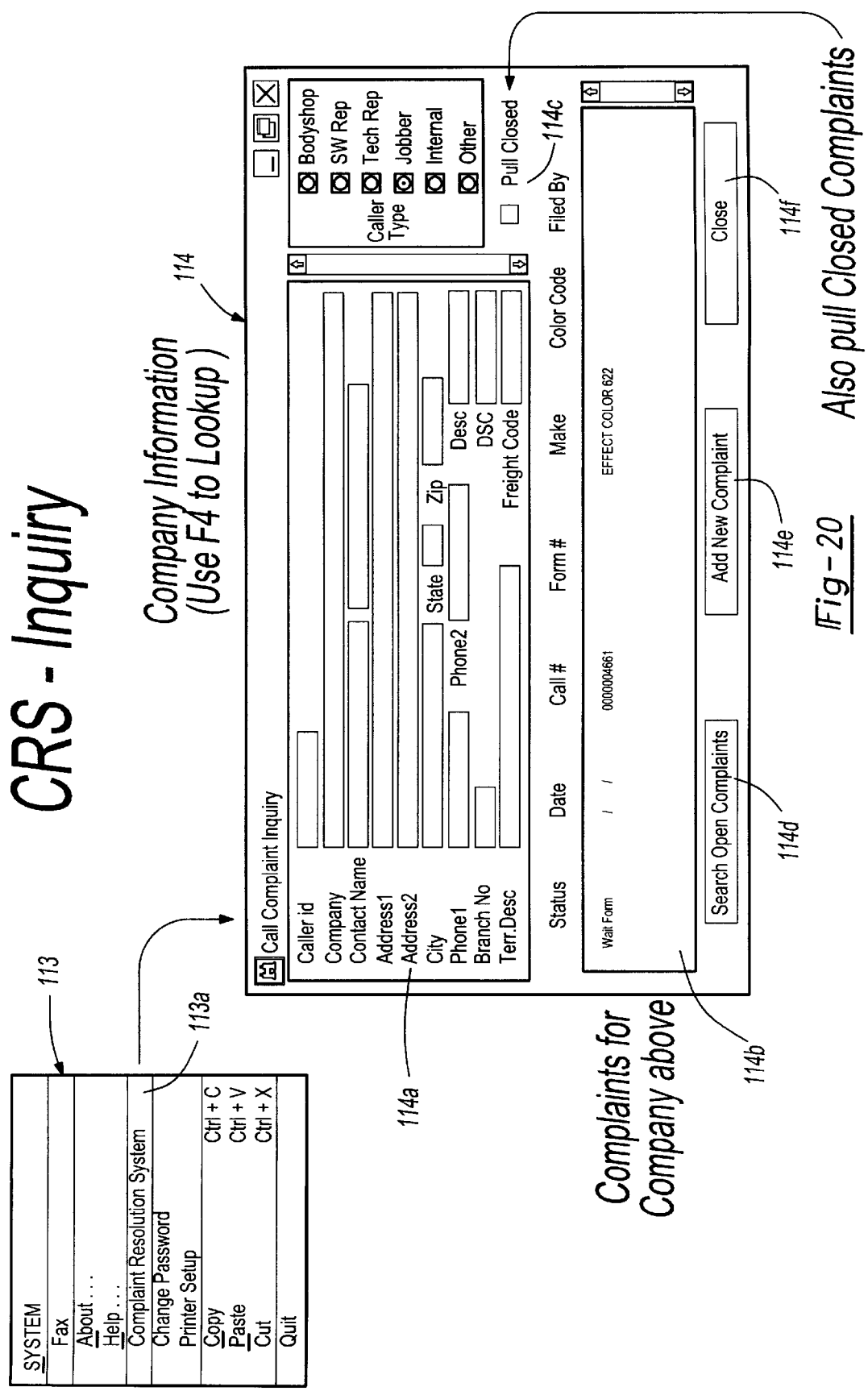

If an Other command button 47g (FIG. 5) is chosen, the program enters an instruction set OTHER 112 (FIG. 4) to perform other functions. One such function can be generating a System menu 113 as shown in the FIG. 20. Referring to the FIG. 20, if a menu item Complaint Resolution System is chosen, a Call Complaint Inquiry window 114 is displayed for the purpose of resolving previously recorded complaints. An upper portion of the window 114 includes a Company Information text area 114a which permits the operator to enter a caller identification number or the company name, or to go to a company information lookup list (not shown) to find the desired company. Once the company has been identified, all open complaints are displayed in a Complaint list box 114b for selection by the operator. A Pull Closed check box 114c permits the operator to also have closed complaints for the selected company displayed in the list box 114b. The selected complaint is retrieved from the database memory 34 (FIG. 3) and displayed in the Color Complaint—USA window 76 (FIG. 12) for action. At the bottom of the window 114 is a Search Open Complaints command button 114d for listing in the list box 114b all open complaints regardless of company, an Add New Complaint command button 114e for adding a new blank complaint for the selected company and a Close command button 114f for returning to the beginning of the program.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for use in providing paint product related information to customers, said apparatus comprising:

a memory (18) for storing paint information related to each of a plurality of paint products and customer information relating to a plurality of customers;

an input means (12) for generating a customer request for information signal related to a selected one of said paint products;

a display (14) for visually displaying said paint information and said customer information; and a computer (13) connected to said memory (18), said input means (12) and said display (14), said computer responsive to said customer request for information signal for selecting from said paint information stored in said memory (18) a portion of information related to said selected one of said paint products and generating a display signal to said display (14) to visually display said portion of information on said display (14), said computer responsive to said customer request for information signal for selecting from said memory customer information and paint information associated with said customer information.

2. The apparatus according to claim 1 wherein said portion of information includes at least one image stored in said memory (18).

3. The apparatus according to claim 2 wherein said one image is one of a technical data sheet image (31), a material safety data sheet image (32) and a paint label image (33).

4. The apparatus according to claim 1 wherein said paint information includes technical data sheet images, material safety data sheet images and paint label images.

5. The apparatus according to claim 1 wherein said input means (12) is actuated by a human operator to generate said customer request for information signal.

6. The apparatus according to claim 1 including a modem (16) connected between said computer (13) and a telephone system (17), said computer (13) generating said portion of information as an output signal through said modem (16) and the telephone system (17) to a customer (26, 29).

7. The apparatus according to claim 1 including a modem (16) connected between said computer means (13) and a telephone system (17) and wherein a customer (26, 29) generates said customer request for information signal related to a selected one of said paint products through the telephone system (17) and said modem (16) to said computer means (13).

8. A system for use in providing paint product related information to customers and recording customer telephone calls comprising:

a memory (18) for storing a first plurality of paint image information (31, 32, 33) related to a plurality of paint products and a second plurality of customer information (34);

an input means (12) for generating a customer request for information signal related to a selected one of said paint products;

a display (14) for visually displaying information and graphic displays in response to display signals;

and a computer (13) connected to said memory (18), said input means (12) and said display (14), said computer responsive to said customer request for information signal for selecting from said customer information (34) caller information related to a customer associated with said customer request for information signal, generating a first display signal to said display (14) to visually display a call log graphic display (43) including said caller information (44), being responsive to said customer request for information signal for selecting from said image information (31,32,33) an image related to technical advice to be given to said customer associated with said customer request for information signal, and generating a second display signal to said display (14) to visually display said image on said display (14).

9. A system for use in providing paint product related information to customers and recording customer telephone calls comprising:

at least two work stations (10, 23) connected by a bus (21) to a memory device (18) and connected to a telephone system (17), said memory device (18) storing a plurality of paint product information and a plurality of customer information; and each said work station (10, 23) including an input device (12) for generating a customer request for information signal related to a selected one of the paint products, a display device (14) for visually displaying information and graphic displays in response to display signals, a computer (13) connected to said memory device (18), said input device (12) and said display device (14) and being responsive to said customer request for information signal for selecting from said customer information caller information related to a customer associated with said customer request for information signal, generating a first display signal to said display device (14) to visually display a call log graphic display (43) including said caller information (44), being responsive to said customer request for information signal for selecting a portion of said paint product information related to advice to be given to said customer associated with said customer request for information signal, and generating a second display signal to said display (14) to visually display (58, 88) said selected portion of said paint product information on said display (14) and a modem (16) connected between said computer (13) and the telephone system (17) for sending said selected portion of said paint product information to said customer associated with said customer request for information signal.

10. The apparatus according to claim 9 wherein said paint product information includes images stored in said memory (18), said images being technical data sheet images (31), material safety data sheet images (32) and paint label images (33).

11. The apparatus according to claim 9 wherein said computer (13) generates said first display signal to said display (14) to visually display a Call Log window (43) on said display (14) and generates a third display signal to said display (14) to visually display at least one of a Select type of . . . command button window (52), a Lookup Information list box (44c), a List of Calls dialog box (52d) and a Voice Mail Being . . . window (54).

12. The apparatus according to claim 9 wherein said computer (13) generates said first display signal to said display (14) to visually display a Call Log window (43) on said display (14) and generates a third display signal to said display (14) to visually display at least one of a Switchboard window (111) and a Call Complaint Inquiry window (114).

13. The apparatus according to claim 9 wherein said computer (13) generates said second display signal to said display (14) to visually display a Color Advice window (58) on said display (14) and generates a third display signal to said display (14) to visually display at least one of a Watermark Professional Edition window (67), a Color Complaint window (72), a Color Complaint—USA window (76), a Search for Cro . . . window (79), a Cross Code dialog box (80) and a Cross Code Notes window (85).

14. The apparatus according to claim 9 wherein said computer (13) generates said second display signal to said display (14) to visually display a Technical Support window (88) on said display (14) and generates a third display signal to said display (14) to visually display at least one of a Technical Advice window (99), a Product Batch Check Information window (102), a Trouble Shooting: Defect window (105) and a Reminder! window (108).

* * * * *